United States Patent [19]

Kourimsky

[11] 4,135,226

[45] Jan. 16, 1979

[54] AUTOMATIC JUNCTION UNIT

[75] Inventor: Friedrich J. A. Kourimsky, Bensheim, Germany

[73] Assignee: AMP Incorporated, Harrisburg, Pa.

[21] Appl. No.: 827,294

[22] Filed: Aug. 24, 1977

[30] Foreign Application Priority Data

Sep. 1, 1976 [GB] United Kingdom ............... 36116/76

[51] Int. Cl.² ............................................... H02B 1/02

[52] U.S. Cl. ..................................................... 361/415

[58] Field of Search ........................ 361/412, 413, 415; 339/17 LM, 17 M, 176 MP

[56] References Cited

U.S. PATENT DOCUMENTS

| | | | |
|---|---|---|---|
| 2,841,660 | 7/1958 | Tabet | 339/17 LM |
| 3,176,261 | 3/1965 | Greco et al. | 339/17 LM |
| 3,184,650 | 5/1965 | Ecker | 361/415 |
| 3,590,330 | 6/1971 | Teagno | 361/413 |

*Primary Examiner*—David Smith, Jr.

*Attorney, Agent, or Firm*—Allan B. Osborne

[57] ABSTRACT

An electrical junction box comprising two printed circuit boards spaced in face-to-face relation in a housing and a series of strip-form fork terminals extending transversely of the board edges and contacting opposite faces of the boards. A tab contact extends from each terminal outside the housing. The housing preferably has a tray-like base open at a top and one side. Board supporting rails extend along the end walls and tab-receiving apertures are formed in the bottom wall.

4 Claims, 11 Drawing Figures

AUTOMATIC JUNCTION UNIT

BRIEF STATEMENT OF THE INVENTION

The invention relates to an electrical junction box for use in the wiring system of an automobile.

According to the invention, the junction box comprises two printed circuit boards mounted spaced apart in face-to-face relation in an insulating housing and a series of terminals mounted in parallel relation adjacent a side wall of the housing and extending transversely of an adjacent edge of each board each terminal having laterally extending contact portions engaging selected tracks on respective boards and a longitudinally extending contact portion protruding externally of the housing.

More specifically, each terminal is stamped and formed from a single piece of sheet metal and comprises two fork contacts extending in spaced co-planar relation laterally of a strip, one longitudinal end of which is adapted to form a tab contact, the fork contacts receiving adjacent edges of the respective boards.

Interboard connections can be effectly solely by these edge contacts avoiding the difficulty of interconnecting the faces of the boards at locations remote from their edges.

The terminals are, advantageously, adapted to be latched into channels provided in the side wall. Preferably, the housing has a base comprising opposed end walls extending perpendicularly away from opposite edges of the sidewall and provided with parallel channels or rails locating the boards, and a bottom wall with tab receiving apertures adjacent its junction with the sidewall, the arrangement being such that the base is open at a top and other side. This enables contacts to be inserted through the open top into the channels in the side wall so that the tabs protrude through the apertures in the base. The boards can then be inserted into the channels from the other open side and pushed into the respective fork contacts. Thus, the boards and terminals can be assembled and connected in the housing base automatically in two simple steps.

A cover for the open top and side is latched to the base which cover is adapted to mount external connectors both to the edges of the printed circuit boards and the face of the upper printed circuit board. Such connectors may be for relays, fuses etc.

The junction box may include a power supply bus of ladder strip form with tabs extending in a common direction from the rungs perpendicularly of the plane of the strip and protruding externally of the housing through apertures in the bottom wall, a fork contact extending in the opposite direction and towards the open side to receive an edge of a board.

Examples of a junction box according to the invention will now be described with reference to the accompanying drawings in which.

Figure 1:
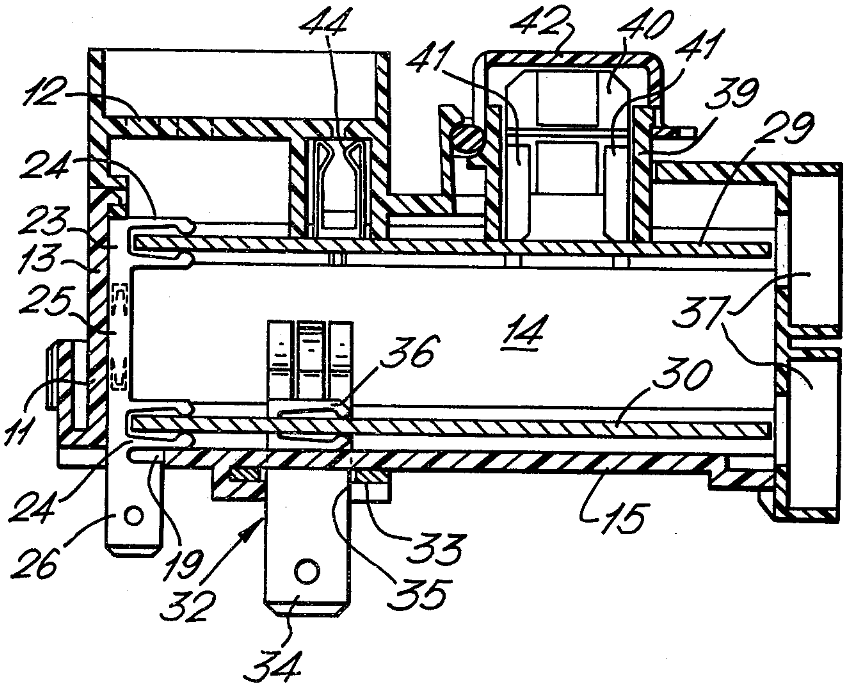
FIG. 1 is a cross-sectional view of a first example of junction box.

The first example of junction box comprises a bipartite housing moulded from plastics material and including a base 11 and cover 12 releasably latched to the base. The base is open at a top and one side and comprises a side wall 13, opposed end walls 14 extending perpendicularly from opposite edges of the side wall, and a bottom wall 15. The side wall 13 is formed internally with a series of terminal receiving channels 17 having recesses 18. The bottom wall is formed with a corresponding series of apertures 19 aligned with respective channels. The walls of the channels towards the open top are chamfered. The end walls are formed with parallel pairs of opposed channels 21 extending perpendicularly away from the side wall toward the open side.

Figure 6:
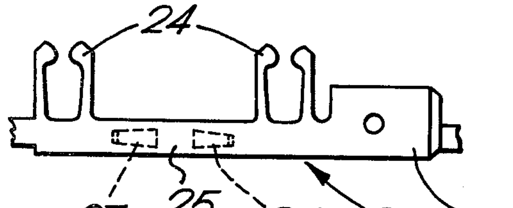
FIG. 6 is a plan view of a terminal strip.
Figure 7:
FIG. 7 is a side view of the terminal strip shown in FIG. 6.
Figure 2:
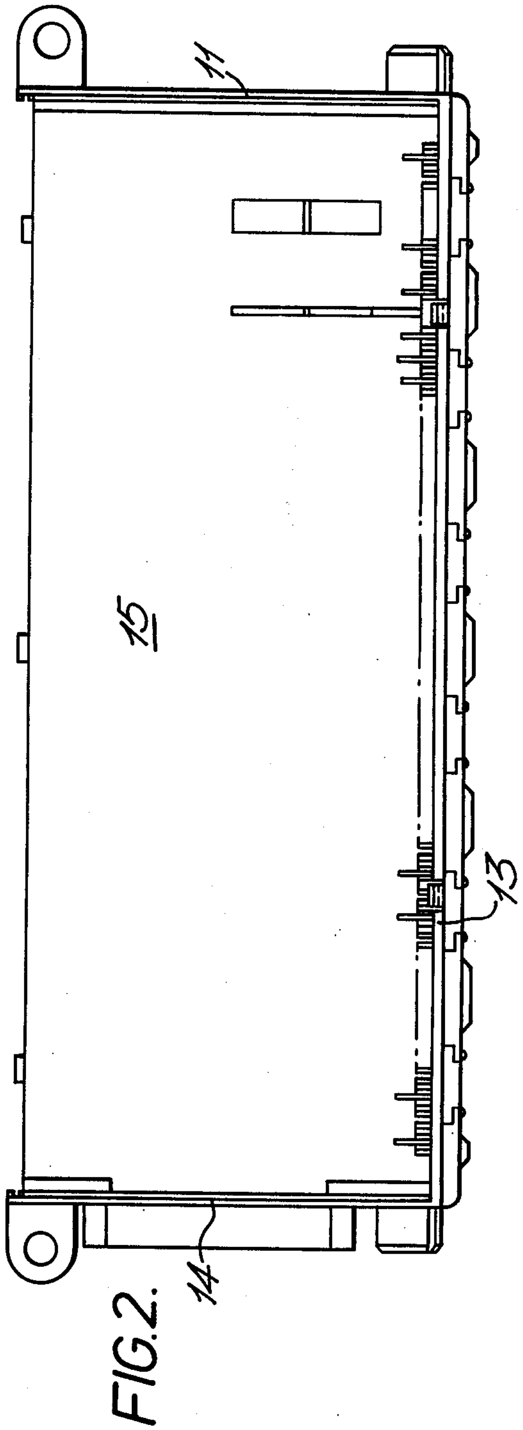
FIG. 2 is a plan view of the base of the junction box housing.
Figure 3:
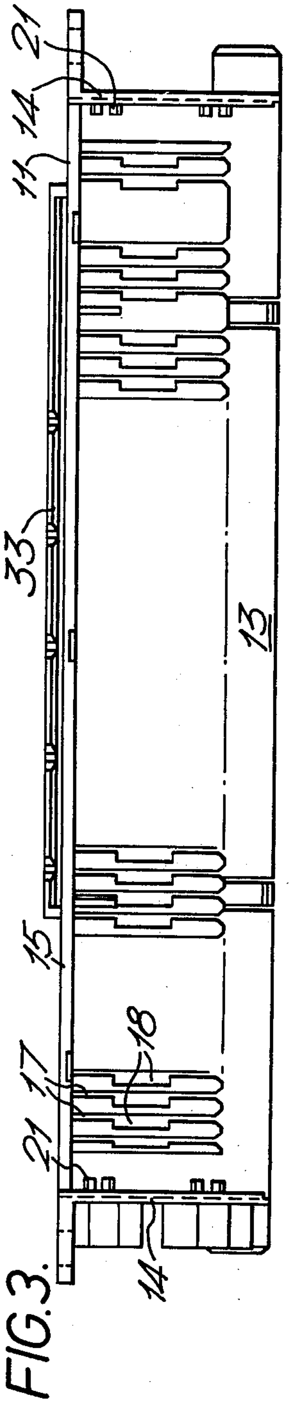
FIG. 3 is a side view of the base shown in FIG. 2.
Figure 4:
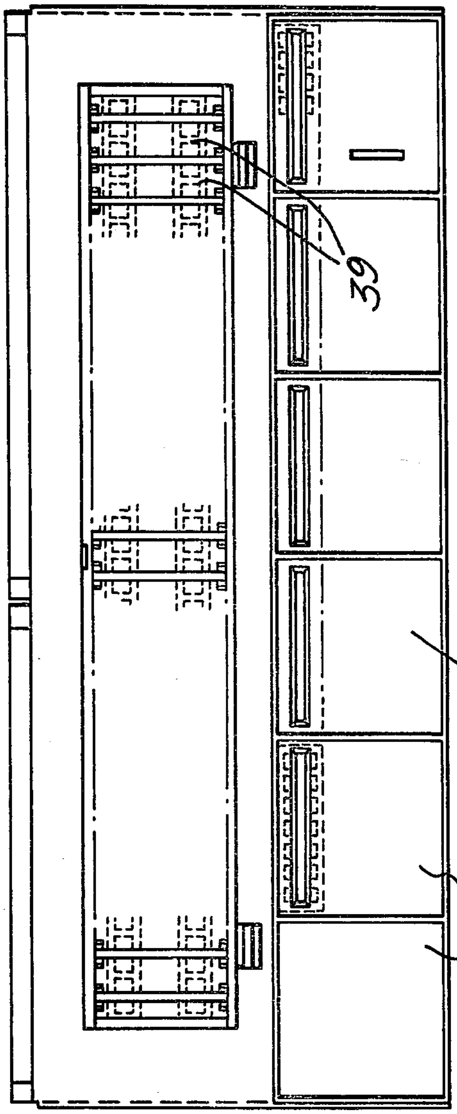
FIG. 4 is a plan view of the cover of the junction box housing.
Figure 5:
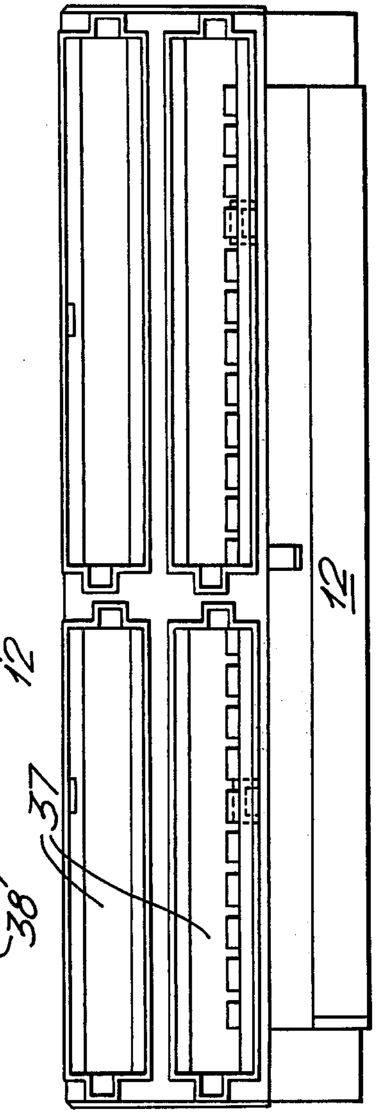
FIG. 5 is a side view of the cover shown in FIG. 4.

A series of terminals 23 (FIGS. 6 and 7) are mounted in respective channels in parallel relation. Each terminal is stamped and formed from sheet metal stock and comprises two fork contacts 24 extending transversely from a strip portion 25 in spaced co-planar relation, one axial end of the strip constituting a tab contact 26 protuding externally through the aligned aperture. The terminal is formed from stock folded into double thickness and oppositely extending locking lances 27 are stamped from one layer at a location between the fork contacts and are received in recesses 18.

Printed circuit boards 29, 30 each having tracks on both faces are mounted in face-to-face relation in respective pairs of opposed channels and have adjacent edges gripped by respective fork contacts of each terminal.

Figure 8:
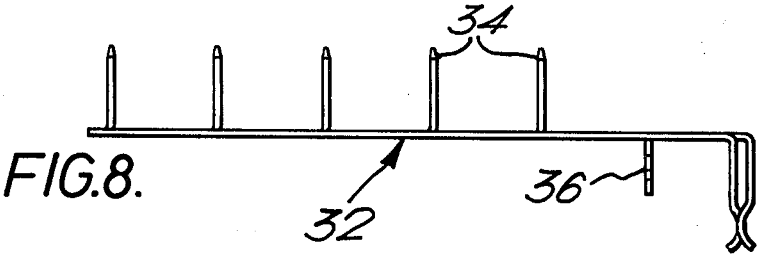
FIG. 8 is a side view of a bus.
Figure 9:
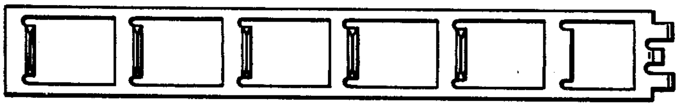
FIG. 9 is a plan view of the bus shown in FIG. 8.
Figure 10:
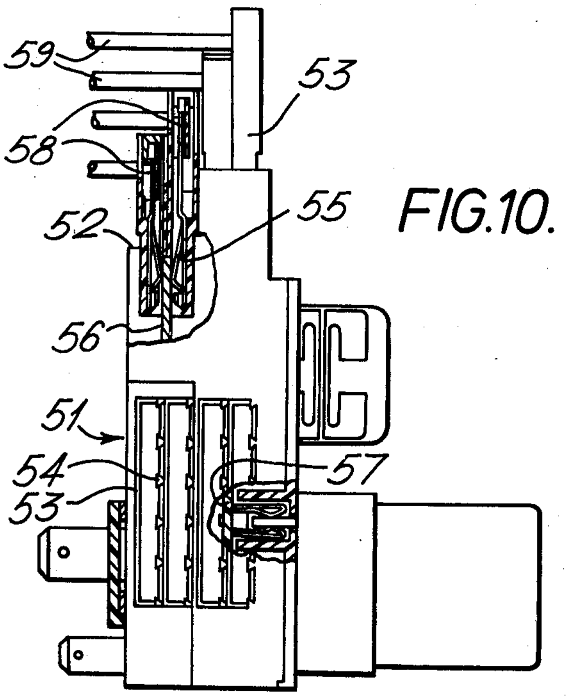
FIG. 10 is a side view of a second example of junction box partly in cross-section.
Figure 11:
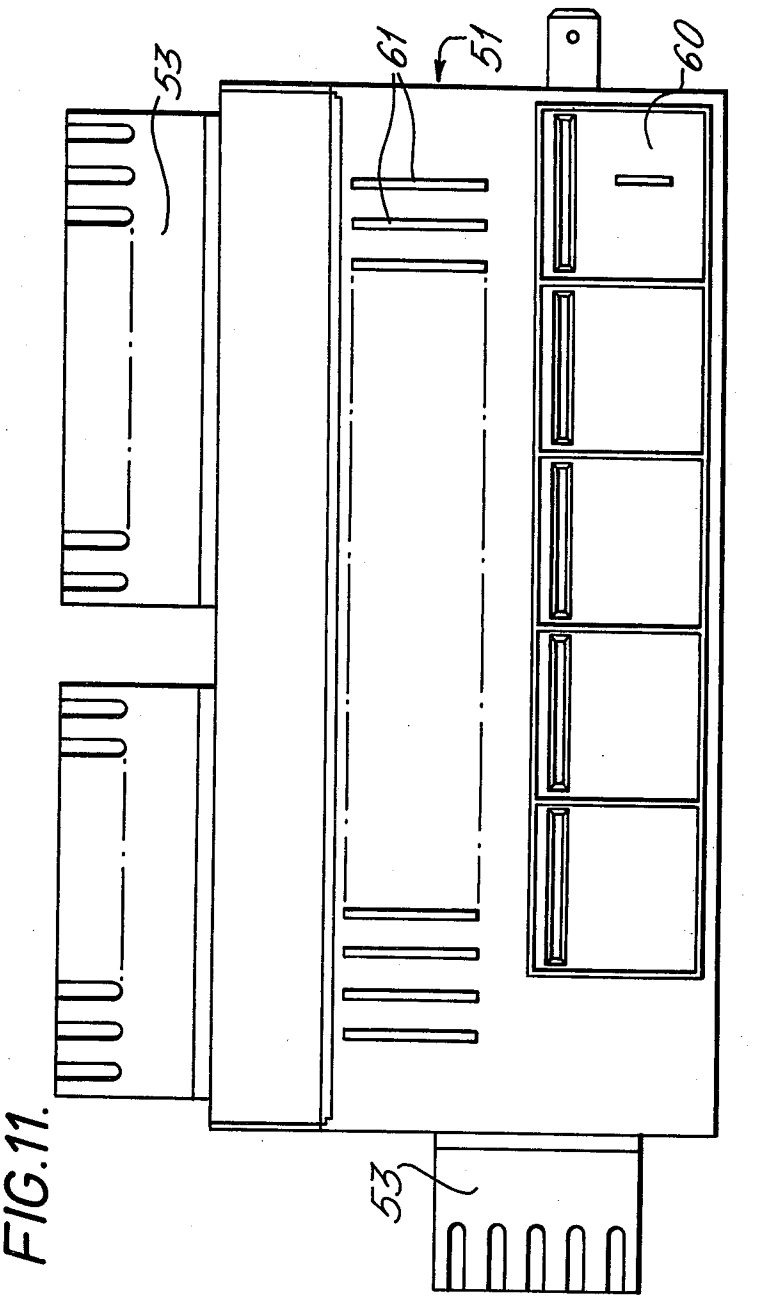
FIG. 11 is a plan view of the second example of junction box.

A bus 32 (FIGS. 8 and 9) for power supply is located in a pocket 33 on the bottom wall and comprises a ladder strip with tabs 34 extending from the rungs perpendicularly to the plane of the strip and protruding externally of the housing through apertures 35 in the pocket wall. Electrical connection is made to a printed circuit board 30 by a fork contact 36 opening towards the open side of the base.

The cover is formed with compartments 37, 38, 39 for mounting edge connectors receiving edges of the boards adjacent the open side and end of the base, relays and fuses respectively, the fuse compartment being provided with a hinged lid 42, if desired as shown in FIG. 1. The edge connectors may be constructed as described in our patent application No. 709980 (4635). It should be noted that the receptacle terminals 44 and 41 for the relays (not shown) and fuses 40, respectively, are connected directly to the upper face of the upper printed circuit board. Thus all connections to or between the printed circuit boards are made outside the overlapping area of the printed circuit boards avoiding the difficulty of making face-to-face connections.

In assembling the junction box, the terminals are stitched into selected channels through the open top of the base and the bus inserted into the socket of the base which is then rotated through 90° to permit the printed circuit board channels to be inserted into the channels through the open side and gripped by the fork contacts. The cover is then snap-fitted onto the base covering the top and open side. Edge connectors, fuses and relays can be plugged into the cover to contact the boards where desired.

It should be noted that the junction box is designed for assembly by automated mass-production techniques without the need for access between the printed circuit boards to make the necessary electrical connections thereto.

In the second example of junction box 51, generally similar to the first example an end wall 52 of the cover is stepped to provide staggered compartments for receipt of connectors 53 described in our U.K. patent application No. 23624/77 (4723). Pairs of connectors 53 are linked together by dovetail joints 54 so that contact portions 55 are fixed in opposed spaced relation to engage opposite sides of respective printed circuit boards 56, 57 arranged in face-to-face relation. The wire connecting portions 58 of the connectors of each pair are staggered to permit perpendicular lead out of the wires in the same direction. This allows several connectors to be mounted adjacent each other and avoids wire tangling. Compartments 60 and slots 61 may be provided in the cover for relays and fuses respectively.

The staggering of the wire connecting portions 58 may also permit closer spacing of the printed circuit boards as the wire connecting portions often represent the greatest connector width.

The above-described junction boxes are designed for use in automobile wiring systems where compactness and economy of manufacture are important parameters.

I claim:

1. An electrical junction box comprising two printed circuit boards mounted spaced apart in face-to-face relation in an insulating housing and a series of terminals mounted in parallel relation adjacent a side wall of the housing and extending transversely of an adjacent edge of each board, each terminal comprising an elongated strip having two fork contacts extending in spaced coplanar relation laterally of the strip, said contact engaging selected tracks on respective boards, and further, said strip having at one longitudinal and a tab contact protruding externally of the housing.

2. An electrical junction box according to claim 1 in which the insulating housing has a sidewall and opposed end walls extending perpendicularly away from opposite edges of the sidewall and provided with parallel channels locating the boards, and a bottom wall with tab receiving apertures adjacent its junction with the sidewall, the arrangement of said walls being such that the base is opened at a top and one side.

3. An electrical junction box according to claim 2 in which the one sidewall of the housing provides compartments adapted to receive connectors to edges of at least one printed circuit board, said compartments being staggered in relation to the insertion direction of the connectors.

4. An electrical junction box according to claim 3 including a power supply bus of ladder strip form with tabs extending in a common direction from the rungs perpendicularly of the plane of the strip and protruding externally of the housing through apertures in the bottom wall, a fork contact extending in the opposite direction and towards the open side to receive an edge of a board.

* * * * *